Figure 1:
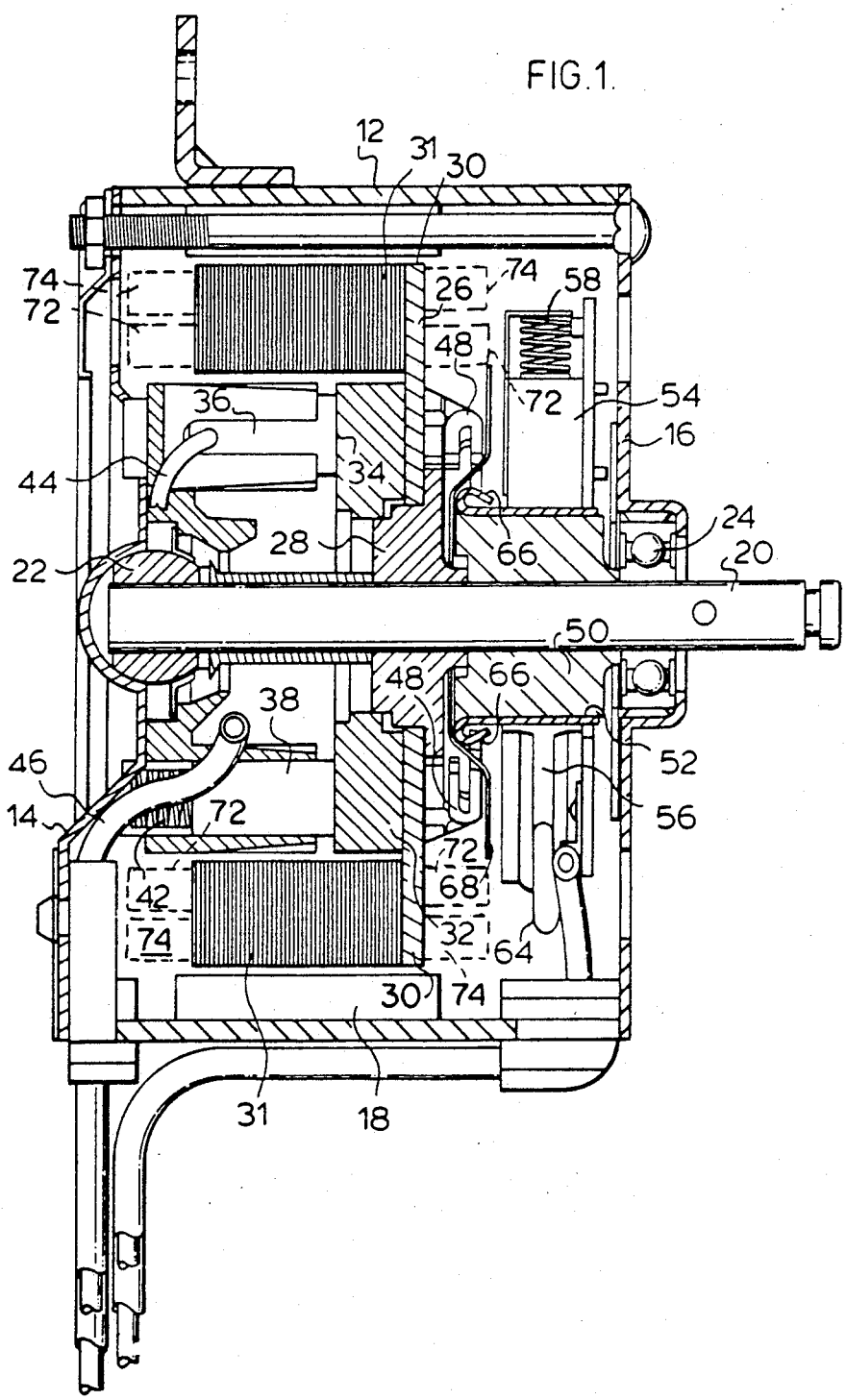

United States Patent [19]

Kershaw

[11] Patent Number: 4,910,790
[45] Date of Patent: Mar. 20, 1990

[54] TWO-SPEED MOTOR

[75] Inventor: Peter A. Kershaw, London, Canada

[73] Assignee: Magna International (Canada) Inc., Markham, Canada

[21] Appl. No.: 312,417

[22] Filed: Feb. 21, 1989

Related U.S. Application Data

[63] Continuation of Ser. No. 2,880, Jan. 13, 1987, abandoned.

[51] Int. Cl.⁴ ............................................. H02P 5/00
[52] U.S. Cl. ..................... 388/836; 310/136; 310/138; 310/154; 310/261; 318/292; 318/541
[58] Field of Search .................. 310/46, 154, 136–149, 310/114, 234, 233, 237, 177, 133, 134, 261, 89, 91, 68 A, 68 B; 318/292, 244, 255, 541, 305, 337, 340, 351, 353, 361, 772; 388/800, 836

[56] References Cited

U.S. PATENT DOCUMENTS 2,408,210 9/1946 Heddleson et al. .................. 310/233
2,814,770 11/1957 Tourtellot ........................... 318/305

FOREIGN PATENT DOCUMENTS 2122132 8/1972 France .
2041677 9/1980 United Kingdom ................ 318/305

OTHER PUBLICATIONS

Patent Abstracts of Japan, vol. 4, No. 90 (E—17) (573), 28th Jun. 1980; JP—A—55 56 457 (Tokyo Shibaura Denki K. K.) 25—04—80, whole abstract.

Primary Examiner—R. Skudy
Attorney, Agent, or Firm—Cushman, Darby & Cushman

[57] ABSTRACT

A two-speed permanent magnet D.C. electric motor has a housing, permanent magnets carried by the housing, and an armature assembly installed in the housing. The armature assembly has a shaft rotatably mounted in the housing, first coil windings, a first commutator connected to the first coil windings, second coil windings and second commutator connected to the second coil windings. A first set of brushes is carried by the housing and engages the first commutator for applying a D.C. voltage to the first coil windings to cause rotation of the armature assembly at a first speed. A second set of brushes is carried by the housing and engages the second commutator for applying the same D.C. voltage to at least the second coil windings to cause rotation of the armature assembly at a second speed.

10 Claims, 3 Drawing Sheets

TWO-SPEED MOTOR

This is a continuation of application No. 002,880, filed Jan. 13, 1987, now abandoned.

This invention relates to two-speed permanent magnet D.C. electric motors.

There is a requirement in the automotive industry for two-speed D.C. motors. Such motors are used for example in engine cooling fan assemblies. An engine cooling fan is normally driven at a low speed during normal operation of a vehicle. However, a high-fan speed is required under abnormal conditions, for example when the vehicle is heavily loaded and the ambient tempeature is high.

For various reasons, it is preferred to use a permanent magnet D.C. electric motor to drive an engine cooling fan at a low or high speed. The two-speed facility has previously been achieved by applying a full voltage to the motor for high speed, and by dropping part of the voltage across a resistor placed in series with the motor for low speed. Consequently, ower is lost in the resistor, and the efficiency of the fan assembly is considerably reduced during low speed operation. This is clearly undesirable, particularly since the motor in operating at the lower speed for a greater pecentage of the operating time, with the higher speed only being used in abnormal conditionss such as those mentioned above.

In U.K. Published Patent Application 2041677, there is disclosed a two-speed permanent magnet D.C. electric motor in which the armature assembly includes first coil windings, a first commutator connected to the first coil windings, second coil windings, and a second commutator connected to the second coil windings. First brush means is carried by the housing and engages the first commutator for applying a D.C. voltage to the first coil windings to cause rotation of the armature assembly at a first speed, and second brush means is carried by the housing and engages the second commutator for applying the same D.C. voltage to at least the second coil windings to cause rotation of the armature assembly at a second speed.

The U.K. publication discloses two different arrangements of the first commutator with its cooperating brushes and the sescond commutator with its cooperating brushes. In one arrangement (FIG. 1), both commutators are cylindrical and disposed in side-by-side relation to one another on one side of the coil windings. In the second arrangement (FIG. 5), both commutators are cylindrical but one is on one side of the coil windings while the other commutator is on the other side of the coil windings. In either event, the axial dimension of the motor is increased resulting in a motor envelope which in many cases is too large to be utilized within the crowded space available under the hood of many automotive vehicles. There still exists a need for a two-speed permanent magnet D.C. electric motor which can be produced in a cost effective manner within a motor envelope comparable to the envelope of comparable one-speed motors.

It is an object of the present invention to fulfill the above-described need. In accordance with the principles of the present invention, this objective is obtained by providing a two-speed permanent magnet D.C. electric motor comprising a housing having axially spaced first and second ends and a peripheral wall therebetween. A series of permanent magnets are carried by the housing adjacent the peripheral wall for creating a fixed magnetic flux field therein. An armature assembly is installed in the housing which comprises a shaft rotatably mounted in the housing, laminations having a plurality of radially extending arms defining a plurality of coil receiving peripheral slots therebetween, first and second coil windings in the slots, a first commutator electrically connected with the first coil windings, and second commutator electrically connected with the second coil windings. The laminations have an exterior periphery disposed to rotate with the shaft in an annular plane disposed in closely sapced relation to the permanent magnets and an interior periphery disposed to rotate with the shaft in an annular plane defining an annular sace surrounding the shaft which communicates axially with the first end of the housing. First brushes are carried by the first housing end to extend within the annular space adjacent the second housing end in cooperating relation with the first commutator and second brushes are carried by the housing in cooperating relation with the second commutator. An electric circuit serves to selectively connect a D.C. voltage alternatively (1) to only one of the first and second brushes so as to enable the associated commutator to transmit the D.C. voltage through the first and second coil windings in such a way as to cause the armature assembly to continuously rotate at a second speed for any given load thereby enabling the motor to opeate at substantially the same efficiency whether connected as in alternative (1) to operate at the first speed or as in alternative (2) to operate at the second speed.

Figure 2:
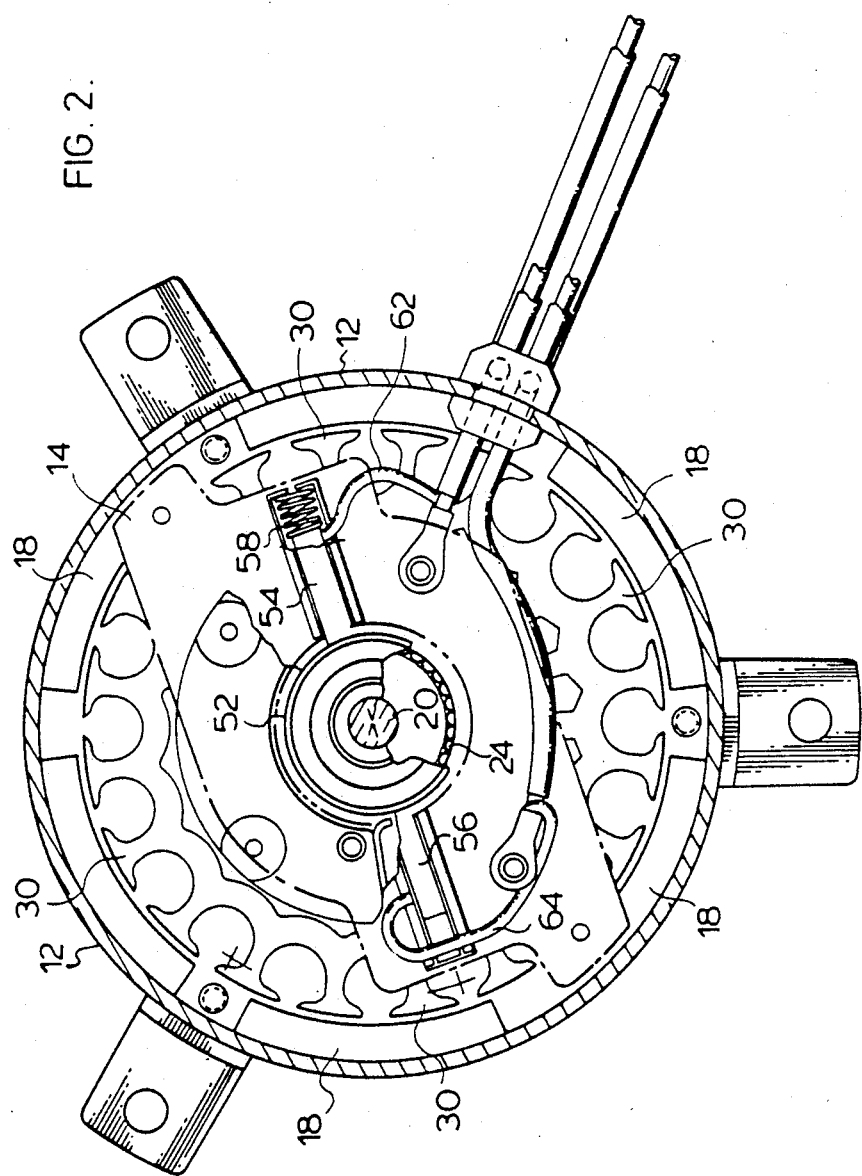
Figure 3:
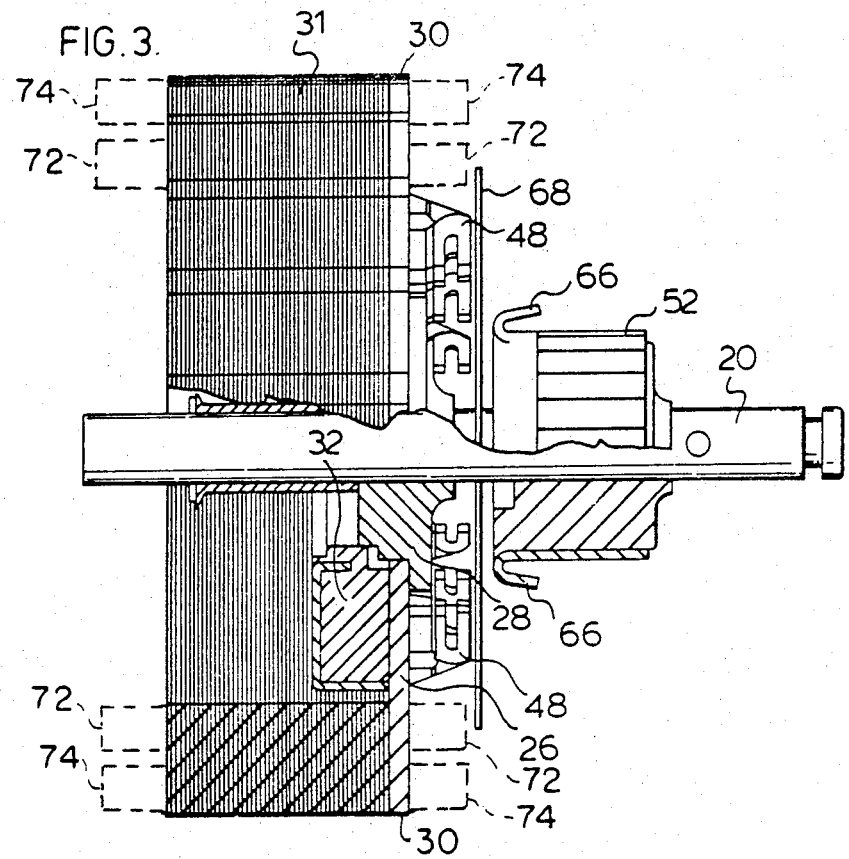
Figure 4:
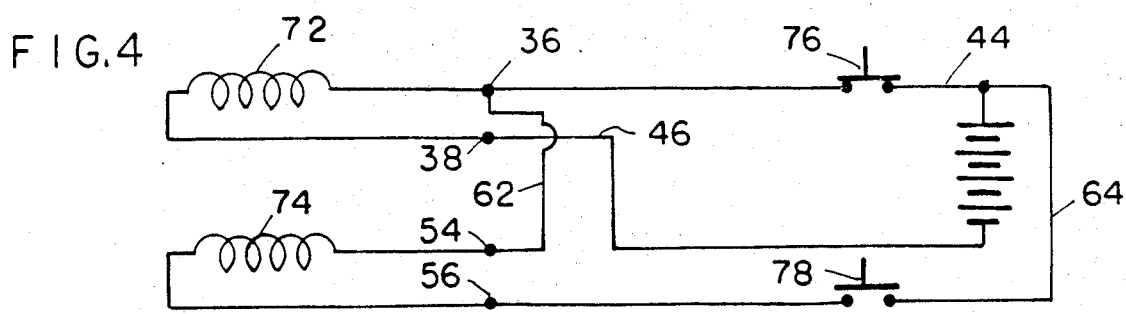
Figure 5:
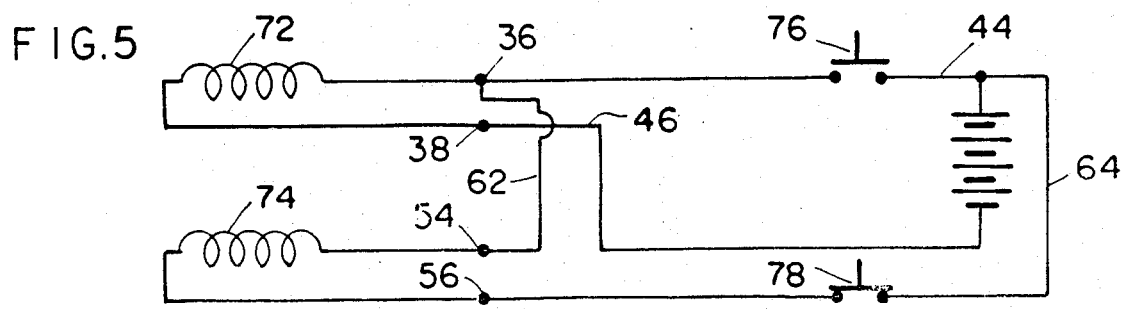

One embodiment of the invention will now be described, by way of example, with reference to the accompanying drawings, of which:

FIG. 1 is a longitudinal sectional view of a two-speed permanent magnet D.C. electric motor in accordance with the invention, FIG. 2 is an end view (partly broken away) of the motor from the right of FIG. 1, the coil windings being omitted for clarity, FIG. 3 is a side view, partly in section, of the armature assembly in a partially assembled condition, FIG. 4 is an electrical circuit diagram showing the connections of the D.C. voltage to the coil windings to produce high speed motor operation, and FIG. 5 is an electrical circuit diagram showing the alternative connections of the D.C. voltage to the coil windings to produce low speed motor operation.

Referring to the drawings, a two-speed permanent magnet D.C. electric motor has a housing with a cylindrical body 12 and end plates 14, 16. Six arcuate permanent magnets 18 are secured at angularly spaced intervals to the interior of the housing body 12.

An armature assembly has a shaft 20 rotatably mounted in bearings 22, 24 carried by the end plates 14, 16 respectively. An armature mounting plate 26 is mounted on the shaft 20 through the intermediary of a hub 28. The armature mounting plate 26 has radially extending arms 30 spaced apart annularly by coil receiving slots, as shown in FIG. 2. As best shown in FIG. 1, a series of annular laminations 31 of similar shape provide the arms 30 with an axial extent sufficient to define cores around which two sets of coil windings, indicated at 72 and 74 in dotted lines in FIGS. 1 and 3, are wound. In accordance with the principles of the present invention, it will be noted that the laminations 31 include an exterior periphery disposed to rotate with the shaft 20 in an annular plane disposed in closely spaced relation to the magnets 18 and an interior periphery disposed to rotate with the shaft 20 in an annular plane defining an annular space surrounding the shaft 20 which communicates with the end of the housing containing the bearing 22. The low and high speed windings are schematically rather than how they actually appear shown in the drawings, but the nature of these windings will be readily apparent to a person skilled in the art from the following description.

A radially extending commutator 32 is carried by the armature mounting plate 26, the commutator 32 having a radially extending commutator surface provided by a set of commutator bars 34 successive opposite pairs of which are engaged by a pair of commutator brushes 36 and 38 carried by housing end plate 14 to extend within the annular space defined by the interior periphery of the laminations 31. The brushes 36 and 38 are urged into engagement with successive opposed pair of radially extending commutator bar 34 by springs 42. The commutator brushes 36 and 38 are connected to electrical leads 44 and 46 respectively. In accordance with conventional practice, the radially extending commutator 32 is provided with a number of commutator hookes 48 commensurate with the number of bars 34 through which the bars are electrically connected to the coil windings 72. As shown, hooks 48 project from the armature mounting plate 26 on the opposite side thereof from the commutator 32.

A cylindrical commutator 50 is mounted on the shaft 20 between the hub 28 and the housing end plate 16, the commutator 50 having a cylindrical commutator surface provided by a set of commutator bars 52 successive opposite pairs of which are engaged by a pair of commutator brushes 54 and 56 carried by housing end plates 16. The brushes 54 and 56 are urged into engagement with the cylindrical commutator bars 52 by springs 58 respectively. The commutator brushes 54 and 56 are connected to electrical leads 62 and 64 respectively. As before the cylindrical commuator 50 is provided with a number of commutator hooks 66 commensurate with the number of bars 52 through which the bars are electrically connected to the coil windings 74. The hooks 66 are located adjacent the hub 28.

A sheet of insulating material 68 is mounted on the shaft 20 between the hub 28 and the cylindrical commutator 50, the insulating sheet 68 extending in a radial direction between the radial commutator hooks 48 and the cylindrical commutator hooks 66.

The windings 72 and 74 are wound over the various arms 30 of the armature body 26 as indicated in FIGS. 1 and 3. A first set of windings 72 is connected to the radial commutator hooks 48 and the other second set of windings 74 is connected to the cylindrical connector hooks 66. During assembly of the armature, as shown in FIG. 3, the first set of windings 72 is wound on the armature arms 30, and are connected to the radial commutator hooks 48. The insulator 68 is placed in position over the commutator hooks 48, and the cylindrical commutator 50 is slid onto the shaft 20.

The second set of windings 74 is then wound on armature arms 30, and appropriate connections made to cylindrical commutator hooks 66. The cylindrical commutator 50 is then pushed to its assembled position adjacent hub 28. The completed armature can then be fitted into the motor housing.

As best shown in FIGS. 4 and 5, one brush 36 of commutator 32 is connectable by lead 44 through switch contacts 76 of a switch to a positive terminal of a D.C. voltage and the other brush 38 is connected by lead 46 to the D.C. negative terminal. One brush 54 of commutator 50 is connected by the lead 62 to brush 36 of commutator 32, and brush 56 is connectable by lead 64 through switch contacts 78 of the switch to the D.C. positive terminal FIG. 4 illustrates the condition of switch contacts 76 and 78 during high speed operation. Thus, application of the D.C. positive voltage to brush 36 of commutator 32 through closed switch contacts 76 with switch contacts 78 open causes current to be passed through the first set of coil windings 72 only so that the motor operates at a relatively high speed. FIG. 5 illustrates the condition of switch contacts 76 and 78 during low speed operation. Application of the D.C. positive voltage to brush 56 of commutator 50 through closed switch contats 78 with switch contacts 76 open causes current to be passed through the first and second sets of coil windings 72 and 74 in series so that the motor operates at a relatively low speed.

The coil windings may be of any suitable type, for example wave windings or simple lap windings. Also, there may be any number of pairs of magnetic poles. In the present embodiment, the windings are wave windings, and require two brushes only per commutator. There are three pairs of poles, or in other words a total of six magnet poles. From the above, the specific manner of winding the coil windings 72 and 74 in the armature slots defined by the spaced arms 30 and of electrically connecting the same to the associated commutator hooks 48 and 66 respectively will be readily apparent to those skilled in the art.

In use in connection with an engine fan cooling assembly, the motor will usually be operated at the low speed. When predetermined abnormal conditions occur, a D.C. voltage is applied to the radial commutator 32 and hence to the high speeds windings to cause the motor to operate at the high speed. A change from low to high speed and vice-versa may be controlled in any suitable manner, for example by a thermostat which senses engine termperature or engine coolant termperature.

Since the same D.C. voltage is applied to the motor for both low and high speed modes of operation, a satisfactory efficiency can be achieved at low speed as well as high speed. Typical test results have shown low and high speed efficiencies in the low to mid-sixty percentage range.

The second coil windings 74 may use wire of smaller diameter than wire used in the first coil windings 72. The combination of the effective increase in total number of wire turns per coil and the reduction of wire diametre will have the effect of lowering the speed of rotation of the armature under zero load conditions and of lowering the load required to "stall" or reduce the speed of rotation of the armature to zero. This characteristic has the effect of lowering the speed of rotation of the armature for any given load with little change in armature efficiency. Identical wire diameters for both coil windings would allow only a lowering of the armature speed under zero load conditions and would not cause a change in the torque to stall the armature.

In the embodiment described and illustrated above in FIG. 4, the high speed is achieved by using the first set of coil windings 72 only and the low speed is achieved by using the first and second sets of coil windings 72 and 74 in series, as shown in FIG. 5. Alternatively, especially when the first and second coil windings are identical in number of turns per coil and wire diameter, the high speed may be achieved by connecting the first and second sets of coil windings in parallel, i.e. by applying the same D.C. voltage to both commutators, and the low speed may be achieved by removing the D.C. voltage from one of the commutators so as to use one set of coil windings only. However, motor efficiency at low speed will be lower than in the previous embodiment.

Other embodiments of the invention will be readily apparent to a person skilled in the art, the scope of the invention being defined in the appended claims.

I claim:

1. A two-speed permanent magnet D.C. electric motor comprising a housing having axially spaced first and second ends and a peripheral wall therebetween, permanent magnet means carried by the housing adjacent said peripheral wall for creating a fixed magnetic flux field therein, an armature assembly installed in the housing, said armature assembly comprising a shaft rotatably mounted in said housing, lamination means having a plurality of radially extending arms defining a plurality of coil receiving peripheral slots therebetween, first and second coil windings in said slots, first commutator means electrically connected with said first coil windings, and second commutator means electrically connected with said second coil windings, said lamination means having an exterior periphery disposed to rotate with said shaft in an annular plane disposed in closely spaced relation to said permanent magnet means and an interior periphery disposed to rotate with said shaft in an annular plane defining an annular space surrounding said shaft which communicates axially with the first end of said housing, first brush means carried by said first housing end to extend within said annular space in cooperating relation with said first commutator means, second brush means carried by said housing adjacent the second end thereof in cooperating relation with said second commutator means, and means for selectivily connecting a D.C. voltage alternatively (1) to only one of said first and second brush means so as to enable associated commutator means to transmit the D.C. voltage through associated coil windings in such a way as to cause the armature assembly to continuously rotate at a first speed for any given load or (2) to both said first and second brush means so as to enable the first and second commutator means to transmit the D.C. voltage through the first and second coil windings in such a way as to cause the armature assembly to continously rotate at a second speed for any given load thereby enabling the motor to operate at substantially the same efficiency whether connected as in alternative (1) to opeate at said first speed or as in alternative (2) to operate at said second speed.

2. A two-speed permanent magnet D.C. electric motor as defined in claim 1 wherein the first and second brush means are connected in series in the connection of alternative (2) so that the second speed of alternative (2) is slower than the first speed of alternative (1).

3. A two-speed permanent magnet D.C. electric motor as defined in claim 1 wherein the second coil windings are of smaller wire when compared with said first coil windings.

4. A two-speed permanent magnet D.C. motor according to claim 1 wherein said armature assembly includes a mounting plate fixed to said shaft and extending outwardly therefrom, said mounting plate having a first side facing the first end of said housing beteween which said first commutator means and said first brush means are located and a second side facing the second end of said housing between which said second commutator means and said second brush means are located, said lamination means being fixed to and extending axially from the first side of said mounting plate toward the first end of said housing.

5. A two-speed permanent magnet D.C. motor according to claim 4 wherein saif first brush means includes a plurality of axially extending brushes mounted on said first housing end for resiliently biased axial movement in a direction away from said first housing end, said first commutator means including radial surface means extending outwardly from said shaft and facing toward the first end of said housing for engagement by said axially extending brushes.

6. A two-speed permanent magnet D.C. motor according to claim 5 wherein said ssecond brush means comprises a plurality of radially extending brushes mounted on said second housing end for resiliently biased radial movmeent in a direction toward·said shaft, said second commutator means including cylindrical surface means disposed in surrounding relation to said shaft and facing radially outwardly for engagement by said radially extending brushes.

7. A two-speed permanent magnet D.C. electric motor as defined in claim 6 wherein the first and second brush means are connected in series in the connection of alternative (2) so that the second speed of alternative (2) is lower than the first speed of alternative (1).

8. A two-speed permament magnet D.C. electric motor as defined in claim 7 wherein the second coil windings are of smaller wire when compared with said first coil windings.

9. A two-speed permanent magnet D.C. electric motor as defined in claim 1 wherein said first brush means includes a plurality of axially extending brushes mounted on said first housing end for resiliently biased axial movement in a direction away from said first housing end, said first commutator means including radial surface means extending outwardly from said shaft and facing toward the first end of said housing for engagement by said axially extending brushes.

10. A two-speed permanent magnet D.C. electric motor as defined in claim 9 wherein said second brush means comprises a plurality of radially extending brushes mounted on said second housing end for resiliently biased radial movement in a direction toward said shaft, said second commutator means including cylindrical surface means disposed in surrounding relation to said shaft and facing radially outwardly for engagement by said radially extending brushes.

* * * * *